June 5, 1928.
O. D. GIBBS
1,672,453
KNOCKDOWN FRUIT CRATE AND METHOD OF PACKING IT
Filed Feb. 9, 1927
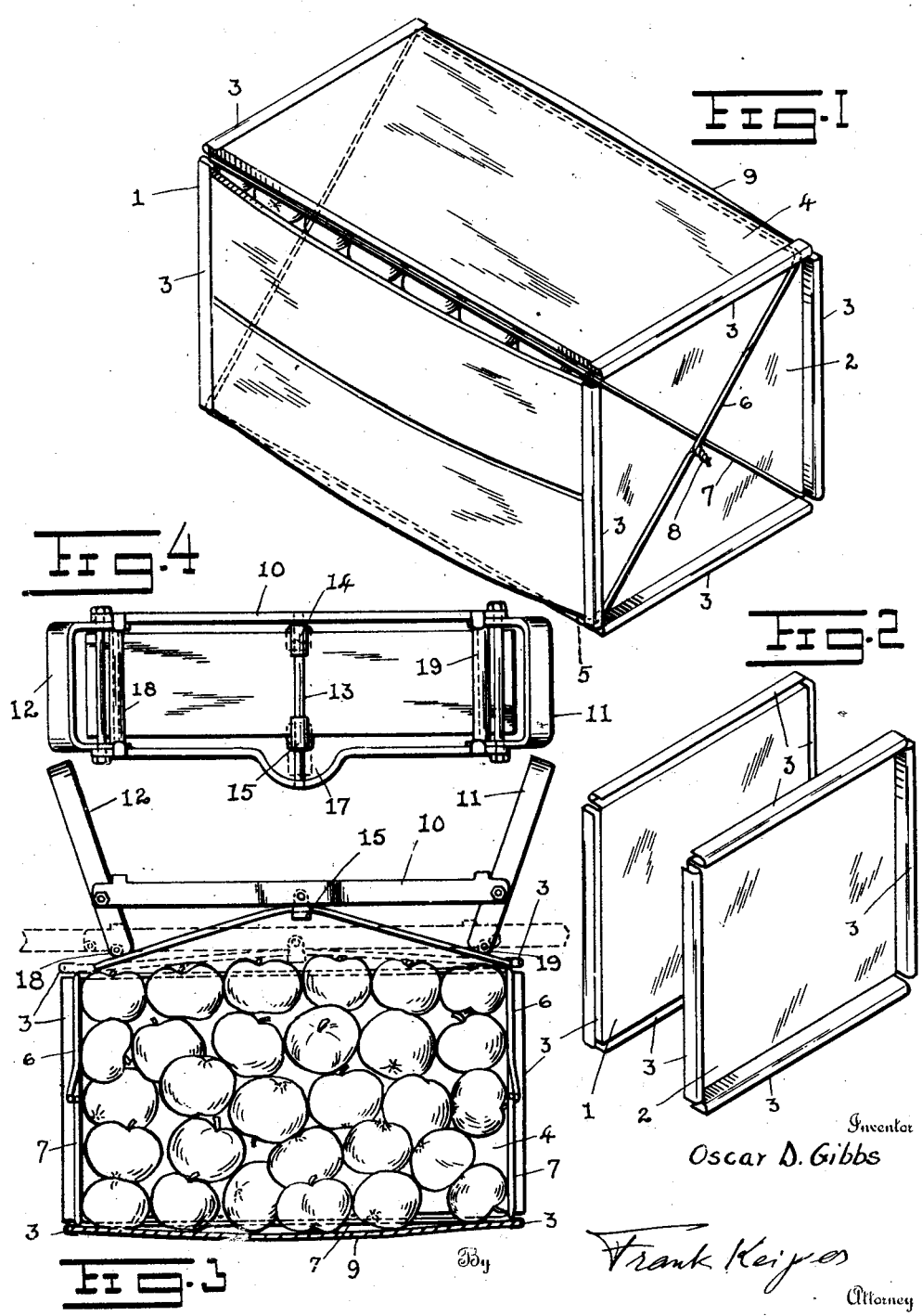
Inventor
Oscar D. Gibbs
By Frank Keipes
Attorney Patented June 5, 1928.

1,672,453

UNITED STATES PATENT OFFICE.

OSCAR D. GIBBS, OF WEBSTER, NEW YORK, ASSIGNOR OF ONE-FOURTH TO SWEENEY AND BOLAND, A COPARTNERSHIP CONSISTING OF MICHAEL E. SWEENEY, OF BRIGHTON AND ROCHESTER, NEW YORK, AND JOHN G. FOGARTY, OF ROCHESTER, NEW YORK.

KNOCKDOWN FRUIT CRATE AND METHOD OF PACKING IT.

Application filed February 9, 1927. Serial No. 167,030.

In packing fruit such as apples, oranges, etc. it is desirable to place the fruit under a slight compression between the walls of the crate. A shrinkage in the fruit due to a slight drying out of the fruit is thus constantly taken up and experience has taught that this prevents the fruit from getting bruised and eliminates the rotting of the fruit heretofore caused by the bruising of the fruit during shipment.

For this reason fruit crates have heretofore been provided with so-called spring tops or covers which when fastened in place on the crate over the fruit temporarily provide the necessary force for slightly compressing the fruit within it. These crates, however, have been found to be too expensive especially in some sections of the country where the cost of lumber is high and have therefore not been universally adopted. Furthermore the pressure of the spring top after a time gradually diminishes as the top becomes set in its bent form with the result that the pressure on the fruit is gradually released.

The crate forming the subject matter of my invention is a spring top crate in a knockdown structure that overcomes the foregoing objections and in addition provides a method of applying the spring tops to the crate and reversing them at any time so that after the tops have become set, the pressure from them can be restored to hold the fruit again, under constant pressure for a long period which is desirable especially during the cold storage of the fruit.

The construction of this crate and its objects are fully illustrated in the drawings, described in the specification and pointed out in the claims at the end thereof.

In the accompanying drawing:

Figure 1 is a perspective view of a crate made up in accordance with my invention and placed on one side thereof.

Figure 2 is a perspective of the ends from which the crate is made up.

Figure 3 is a longitudinal cross section of the crate with the cover or top thereof in the process of being applied thereto, after the crate has been packed with the fruit.

Figure 4 is a top plan view of the apparatus used for applying the spring cover or top on the crate.

In the several figures of the drawing like reference numerals indicate like parts.

The crate is made up of a pair of sheet metal ends 1 and 2 which are stamped out from sheet metal stock of suitable thickness and weight. These ends are, rectangular in outline and each side has a horizontal channel 3 formed thereon integral therewith. When a crate is to be formed with these ends, they are held spaced apart with the channels of one end facing the channels of the other end. The sides 4 and 5 of the crate each formed by a board are slipped into a pair of these opposing channels 3 of the metal crate ends 1 and 2. After the metal ends and the wooden sides are brought together in this way two wires 6 and 7 are wound around the ends and sides of the crate in the form of two loops. The ends of the horizontal channels 3 provided around the perimeter of each of the metal ends do not quite extend the full length of the sides of the ends and thus provide triangular recesses between adjacent channels in the corners of the metal ends. The wires 6 and 7 are placed into these recesses and are wound around the corners of the crate by extending diagonally across each of the metal ends. The free ends of each of the wires are then twisted together as illustrated at 8 in Figure 1 and the wire loop formed in this way tightened until the metal ends are drawn firmly against the ends of the boards forming the sides 4 and 5 of the crate. The free ends of one of the wires are twisted together at one end of the crate while the free ends of the other wire are twisted together at the other end of the crate.

At the same time the ends 1 and 2 of the crate are thus attached to the metal ends of the crate, the bottom 9 of the crate formed by either one or two lighter boards may also be fastened in place between the metal ends. These bottom boards are simply placed in their respective channels 3 in the metal ends so that when the ends are drawn together by the wires 6 and 7 to hold the sides 4 and 5 in place they will at the same time also hold the bottom in place between the ends.

After the crate is made up in this manner it is packed with the fruit. Apples are illustrated in the crate shown in section in Figure 3. These apples are put into the crate with or without a wrapper around them but are packed so that in the middle of the upper layer the apples project above the sides and the channels of the ends of the crate. This is for a purpose that will presently appear. The filled crate is then closed with a pair of boards forming the cover of the crate. These boards are flexible and in order to put them in place into the channels in the metal ends, the apparatus illustrated in Figures 3 and 4 is used.

This apparatus comprises a rectangular frame 10 having the yokes 11 and 12 pivotally mounted at each end thereof. In the middle the rectangular frame is connected by a guide rod 13 on which a pair of hook members 14 and 15 are mounted to slide. The hook portion of these members oppose each other and when placed as illustrated in Figure 4 are adapted to engage the under side of one of the boards forming the top of the crate. This is done by sliding one of the hook members into the pocket 17 formed in the middle of the inside of the rectangular frame so that the frame can be placed over one of the boards with only one of the hook members engaging the under side of the board at one edge thereof. After the board is positioned with relation to the one hook member, the other hook member is moved against the other side of the board to also engage under it so that the board is now held in the middle between the open ends of the hook members and below the guide rod 13.

The yokes 11 and 12 carry the rollers 18 and 19 at their lower ends and these rollers normally rest on top of the board after it is located under the frame as above pointed out. The board in order to engage and enter into the channels 3 of the metal ends must be shortened and this is done by bending the board as illustrated in Figure 3. This is accomplished by swinging the yokes 11 and 12 with the rollers 18 and 19 so that the rollers force the ends of the board downwardly while the middle of the board is held fixed by the hook members 14 and 15. The bending apparatus with the bent board is then placed over the filled crate and held so that one end thereof engages into the channel 3 of one of the ends while the other end of the board is in line with the channel 3 of the other metal end. When in this position the yokes 11 and 12 are swung back into their normal position so as to allow the ends of the board to straighten out. In straightening out the end of the board that has been held in line with the channel 3 of the metal end enters the channel so that both ends of the board are finally located within the opposing channels of the metal ends while the middle portion of the board exerts a pressure on the top layers of the apples that come in contact with it because of the fact that they project above the top channels of the ends and prevent the board from completely straightening out between the ends of the crate. The boards that make up the top and bottom of the crate are preferably thinner than the boards that are used for the sides of the crate. This makes them springy so that when they are placed on the crate they will yield to the apples that project above the level of the crate and in yielding provide a constant pressure on the apples for a long period.

Should the apples be stored for a long period so that the top and bottom boards become set in their curved position and no longer exert a pressure on the apples within the crate, the pressure can be restored in these boards by reversing them. For this purpose the apparatus above described is placed over the boards to engage and bend them as previously described so that they can be withdrawn from the crate. After the boards are removed they are reversed and are placed into the apparatus and bent in the reverse direction to be placed on top of the box in this reverse position. By reversing the boards of both the top and bottom in this way the pressure on the fruit is again restored so that it can be safely shipped from the storage plant to the retailer or consumer.

After the contents of the crate are removed the crate is knocked down and the crate returned in the knock down form. For this purpose the wire loops 6 and 7 are cut and this releases the metal ends 1 and 2 from the sides 4 and 5 and from the bottom so that the ends can be placed together with the side, top and bottom boards and form a package that will take up but a fraction of the space required for the crate in its assembled form.

Because of the fact that the top or top and bottom of the crate slightly bulge from the crate it is necessary to place the crate on one side when stacking a number of the crates on top of one another. This is illustrated in Figure 1. The metal ends provide the necessary strength to the crate so that the knock down crate is as strong if not stronger than a similar crate manufactured solely from lumber.

I claim:

1. In a knockdown crate for packing fruit, the combination of a pair of metal ends, channels provided on the perimeter of each of said metal ends, a pair of sides adapted to engage opposing chanels in said ends, and wire loops passing over the corners of both of said metal ends and along the edges of said sides from one of said metal ends to the other to draw the channels of said ends against the ends of said sides and means provided at the corners of said metal ends to hold said wire loops adjacent and parallel to the top and bottom of said sides.

2. In a knockdown crate for packing fruit, the combination of a pair of metal ends, a pair of horizontal channels and a pair of vertical channels provided on the perimeter of each of said metal ends, the ends of said channels being cut away to form a notch at each corner of both of said metal ends, a pair of sides adapted to engage opposing channels in said ends, and wire loops wound diagonally over said metal ends from one of said cutaway corners to another and along the edges of said sides to draw the channels of said ends against the ends of said sides, a top placed between a pair of opposing channels of said metal ends and held free to allow a limited endwise movement of the ends of the top within the channels engaged by them.

3. In a knock down crate for packing fruit, the combination of a pair of metal ends, a pair of horizontal and a pair of vertical channels formed and bent outwardly on each of said metal ends, each of said channels being cut away at each end thereof to form a horizontal slot at each corner of each of said metal ends, sides, bottom and top members engaging into opposing vertical and horizontal channels of said metal ends and a wire loop engaging into said horizontal slots and extending from one metal end to the other between adjacent corners of the side members and bottom member and the side members and top member and within the outer edges of each of these members.

In testimony whereof I affix my signature.

OSCAR D. GIBBS.